United States Patent
Lee et al.

(10) Patent No.: US 7,509,403 B1
(45) Date of Patent: Mar. 24, 2009

(54) METHOD AND APPARATUS FOR SONET/SDH RING LOAD BALANCING

(75) Inventors: Ted Chongpi Lee, Holmdel, NJ (US); Chain N. Yung, Freehold, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1974 days.

(21) Appl. No.: 09/672,204

(22) Filed: Sep. 28, 2000

(51) Int. Cl.
*G06F 15/173* (2006.01)

(52) U.S. Cl. .................. 709/223; 709/224; 709/227; 709/238; 709/239; 709/240; 709/241; 709/242; 370/229; 370/238; 370/254; 370/258; 398/57; 398/59

(58) Field of Classification Search .......... 709/223, 709/224–229, 238–242; 370/229–238, 254, 370/258; 398/57, 59
See application file for complete search history.

(56) References Cited

U.S. PATENT DOCUMENTS

| | | | | |
|---|---|---|---|---|
| 5,119,367 A * | 6/1992 | Kawakatsu et al. | ......... | 370/253 |
| 5,471,381 A | 11/1995 | Khan | ......... | 364/148 |
| 5,600,638 A * | 2/1997 | Bertin et al. | ......... | 370/351 |
| 5,657,142 A * | 8/1997 | Fahim | ......... | 398/9 |
| 5,841,604 A | 11/1998 | Supino | ......... | 360/73.03 |
| 5,914,922 A | 6/1999 | Supino et al. | ......... | 369/44.28 |
| 5,956,304 A | 9/1999 | Supino et al. | ......... | 369/44.34 |
| 5,982,721 A | 11/1999 | Supino et al. | ......... | 369/44.28 |
| 6,014,567 A * | 1/2000 | Budka | ......... | 455/453 |
| 6,128,279 A * | 10/2000 | O'Neil et al. | ......... | 370/229 |
| 6,141,303 A | 10/2000 | Supino et al. | ......... | 369/44.28 |
| 6,185,467 B1 | 2/2001 | Romano et al. | ......... | 700/28 |
| 6,263,368 B1 * | 7/2001 | Martin | ......... | 709/224 |
| 6,327,622 B1 * | 12/2001 | Jindal et al. | ......... | 709/228 |
| 6,400,859 B1 * | 6/2002 | de Boer et al. | ......... | 385/24 |
| 6,545,977 B2 * | 4/2003 | Harshavardhana et al. | ......... | 370/222 |
| 6,577,604 B1 * | 6/2003 | Fisher | ......... | 370/252 |
| 6,606,667 B1 * | 8/2003 | Hermann | ......... | 709/239 |
| 6,963,927 B1 * | 11/2005 | Lee et al. | ......... | 709/238 |

OTHER PUBLICATIONS

Morley G.D. et al., 'Optimal Loading of SONET BLSRs', Jun. 1998, Canadian Conference on Broadband Research, Ottowa Canada.*

Wan P.J. et al., 'Load balancing in counter-rotated SONET rings', 1999, International Conference on Parallel Processing, Japan, pp. 542-550.*

Morely,G.D. et al., "Current Approaches in the Design of Ring-based Optical Networks", Sep. 12, 1999, Proceedings of 1999 IEEE Canadian Conference on Electrical & Computer Engineering, pp. 220-225.*

Doshi, B.T. et al., 'Integrated Network Design Tools', Jul. 1997, Alexandria: Egypt, Second IEEE Symposium on Computers and Communications, pp. 332-338.*

(Continued)

*Primary Examiner*—Ramy M Osman

(57) ABSTRACT

A method and apparatus for providing a load balanced circuit path between a source node and a destination node within a SONET ring comprising a plurality of nodes and connected by links by iteratively selecting facilities within a link that have bandwidth utilization levels that are below a threshold level. In an alternative embodiment, an alternate path is selected in case facilities meeting the threshold level can not be found. The threshold level is changed incrementally if facilities and links within the first path and/or alternate path do not meet the threshold levels.

23 Claims, 3 Drawing Sheets

OTHER PUBLICATIONS

Cosares S et al., 'An optimization problem related to balancing loads on SONET rings', 1994 Telecommunication Systems vol. 3, pp. 165-181.*

Buyukkoc C et al., 'Load balancing on SONET rings', 1996 Proceedings of ICT, Istanbul pp. 763-766.*

F.C. Chen, *Adaptive Control of nonlinear systems using Neural networks*, IEEE Control Systems Magazine, vol. 55 No. 6, pp. 1299-1317 (1992).

Cybenko, *Approximation by superpositions of a sigmodial function*, Math. Contr. Signals Syst., vol. 2, No. 4, pp. 303-314 (1989).

* cited by examiner

METHOD AND APPARATUS FOR SONET/SDH RING LOAD BALANCING

TECHNICAL FIELD

The invention relates to the field of communications systems and, more specifically, to a method and apparatus for balancing the load or utilization levels of Synchronous Optical Network (SONET) rings between nodes.

BACKGROUND OF THE INVENTION

In a communications network various elements within the network are managed by a respective element management system (EMS). For example, digital cross-connect systems (DCS) are typically managed by a DCS element management system (EMS) while Synchronous Optical Network (SONET) add-drop multiplexers (ADMs) are managed by a SONET EMS. The DCS-EMS and SONET-EMS and other element management systems are in turn managed by a network management system (NMS). Each domain within a communications network comprising a plurality of domains is managed by a respective network management system (NMS). Intra-domain load balancing, i.e., load balancing within a network and inter-domain load balancing, i.e., balancing between networks, may be effected by EMS-load balancing methods.

Broadly speaking, load balancing within the context of a communications network comprises the "distribution" of data or voice traffic such that no one communication link is over utilized, resulting in a dropped call or broken data link.

Present load balancing methods do not efficiently address load balancing needs within a SONET ring environment. Unfortunately, some paths between nodes in a SONET ring may be over utilized while other paths between nodes are under utilized when an element management system selects the short path between an origination node and destination node without regards to the capacity needs of the ring as a whole.

SUMMARY OF THE INVENTION

The invention comprises a method and apparatus for balancing facility loading levels and/or link loading levels within a SONET ring and avoid, where possible, the over utilization of bandwidth for any individual facility between SONET nodes such that a threshold value will not be exceeded. The invention advantageously provides the efficient use of bandwidth for a SONET ring by opportunistically utilizing unused capacity on the SONET ring.

Specifically, a method according to the invention for determining a first circuit path between a source node and a destination node in a Synchronous Optical Network (SONET) ring comprising a plurality of nodes interconnected by links, each of the links having associated with it a plurality of facilities, each of the facilities having associated with it a respective bandwidth utilization level, wherein facilities having bandwidth utilization levels exceeding a first threshold level are not used to define the first circuit path.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The subject invention will be described within the context of a telecommunication system comprising four network elements or nodes interconnected in a ring topology. However, it will be appreciated by those skilled in the art that the subject invention may be advantageously employed in any communications network in which provisioning of any form of communication may be utilized, such as voice telecommunications, data communications, streaming media communication and the like. Thus, it is contemplated by the inventors that the subject invention has broad applicability beyond the telecommunication network described herein.

Figure 1:
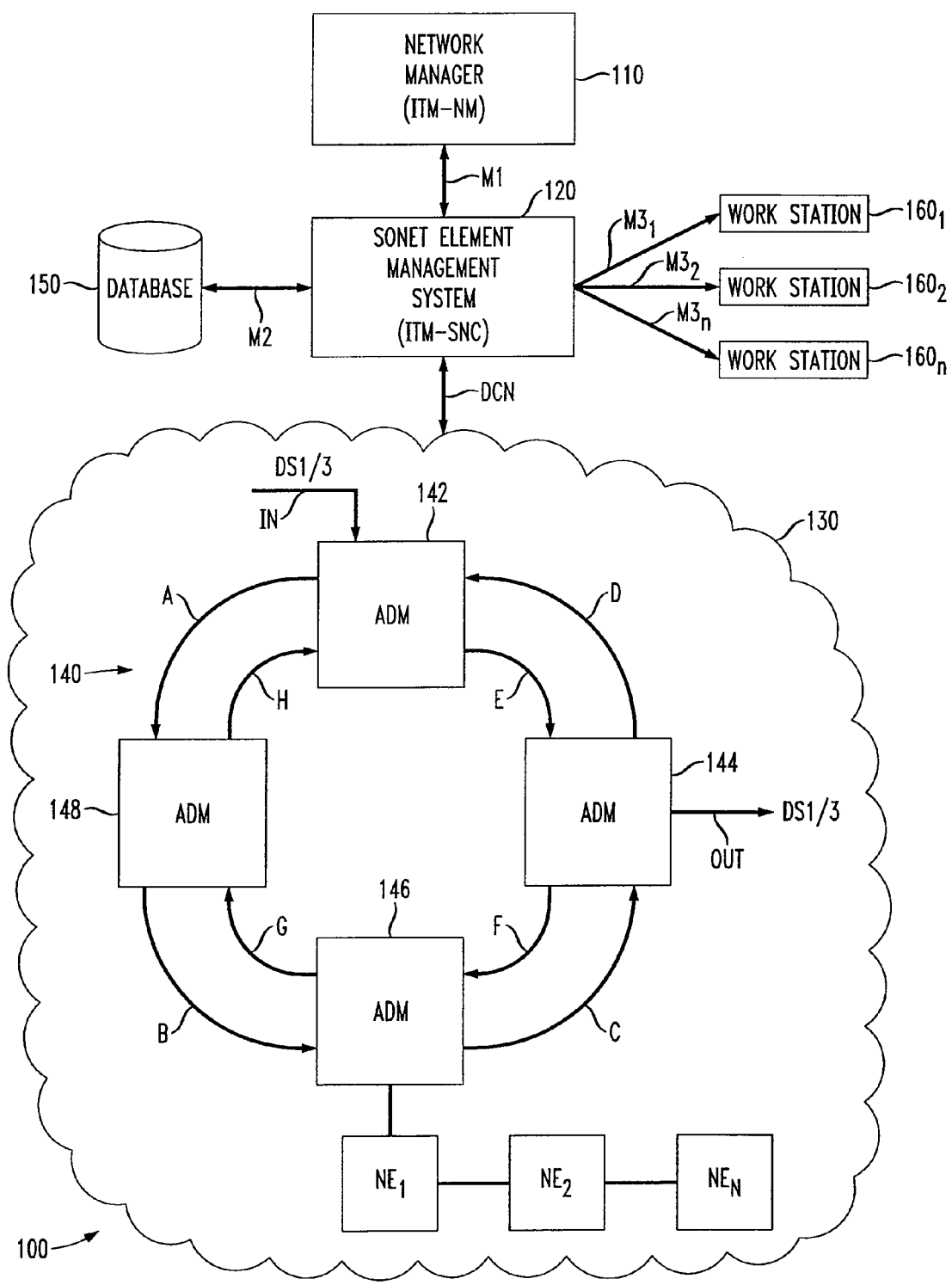
FIG. 1 depicts a high level block diagram of a communications system.

FIG. 1 depicts a high level block diagram of a communications system including an embodiment of the present invention. Specifically, the communications system 100 of FIG. 1 comprises a network manager 110, a SONET element management system (EMS) or controller 120, a communications network 130, a database 150 and a plurality of work stations $160_1$ through $160_n$ (collectively work stations 160). The communications network 130 comprises a plurality of network elements $NE_1$ through $NE_N$ (collectively network elements NE), including a SONET ring 140 and other network elements (not shown). SONET ring 140 comprises, illustratively, four add-drop multiplexers (ADMs) denoted as ADMs 142, 144, 146 and 148.

The network manager 110 comprises, illustratively, an integrated transport management network manager (ITM-NM) manufactured by Lucent Technologies, Inc. of Murray Hill, N.J. The network manager 110 implements network management related functions according to, for example, the Telecommunications Management Network (TMN) standards described in the International Telecommunications Union (ITU) recommendation M.3010 and related documents, which are incorporated herein by reference in their respective entireties. Thus, the network manager 110 is used to manage all network elements within the communications system 100 of FIG. 1, both individually and as a set of network elements. The network manager 110 is operatively coupled to the SONET EMS 120 via a path denoted as M1. It is noted that the network manager 110 manages the SONET ring 140 depicted within the communications network 130 as a single network element. That is, the network manager 110 considers the SONET ring as a network element capable of routing a communication.

The database 150 is operatively coupled to the element manager 120 via a path M2. Database 150 may comprise a standard mass storage device, such as a redundant array of inexpensive devices (RAID) or other known mass storage device cooperating with a data base program such as the Oracle data base provided by Oracle Corporation of Redwood Shores, Calif. All that is necessary is that the database 150 be able to communicate with the element manager 120 in a manner facilitating the storage and retrieval of information, such as characterization and control information pertaining to the SONET ring 140 including loading information regarding the various links interconnecting the nodes in the network. In one embodiment of the invention, the database 150 stores information pertaining to each node within the SONET ring 140 and, more particularly, to the type of links connecting the nodes, the type of channels provided by these links and the loading or bandwidth utilization of the respective links and/or channels. The database 150 also stores information pertaining to the availability of facilities for the various links and/or channels used to communicate between nodes.

Each of the work stations 160 is operatively coupled to element manager 120 via a path $M3_1$, $M3_2$, $M3_n$ (collectively path M3) and communicates with the element manager 120 via, for example, a computer network. It will be appreciated by those skilled in the art that more or fewer work stations 160 may be provided.

Each of the work stations 160 may comprise, for example, a terminal used by a network operator to request the provisioning of communication circuits between start-nodes and end-nodes in response to, for example, requests for such circuits from network users. The work stations 160 may also comprise interfaces between network system users and customers and the element manager 120. Within the context of the present invention, the work stations 160 are used to provide information to the element manager or controller 120 indicative of at least the start node and end node of a circuit to be provisioned, as well as any quality of service (QOS) or other transmission parameters associated with that circuit. Broadly speaking, all that is necessary to practice the present invention is a communication from some entity, such as a work station 160, indicative of the start node and end node of a circuit to be provisioned.

The element manager 120 and database 150 of the communications system 100 of FIG. 1 are depicted as separate functional entities. However, it will be appreciated by those skilled in the art that the element manager 120 and database 150 may be combined within a single functional entity. Thus, the element manager 120 and database 150 may be operably combined to form a network management apparatus suitable for managing the SONET ring 140 according to the present invention.

The SONET element management system 120 comprises, illustratively, an Integrated Transport Management SONET Network Controller (ITM-SNC) manufactured by Lucent Technologies, Inc. of Murray Hill, N.J. The SONET element management system 120 manages all independent SONET network elements, such as Add-Drop Multiplexers (ADMs) within the communications network 130 of FIG. 1. The SONET EMS 120 implements the element management layer of the TMN standard as it applies to SONET network elements. The SONET EMS 120 is coupled to each of the SONET network elements to be managed via a data communications network (DCN) illustratively a Public Switched Packet Data Network (PSPDN) utilizing the X.25 layered packet transmissions protocol. The SONET EMS 120 communicates, via the DCN, with at least one ADM within the SONET network 140 of the communications network 130 of FIG. 1. That is, one ADM within the SONET ring 140 operates as a Gateway Network Element (GNE) that is coupled to the SONET EMS 120 via the DCN. In one embodiment, the SONET embedded Data Communications Channel (DCC) is used for SONET ADM communications within a ring. In this manner, each of the network elements within a SONET ring is managed by the SONET EMS 120 in substantially a standard manner.

While the DCN comprises, illustratively, a PSPDN utilizing the X.25 layered packet transmissions protocol, it will be appreciated by those skilled in the art that the DCN may be implemented using any network control or protocol suitable for providing such network management communication between network elements.

The network manager 110 implements the network management layer of the TMN standard, while the SONET EMS 120 implements the element management layer of the TMN standard. It should be noted that the network management layer implemented by the network manager 110 may also interact with a service management layer (not shown) within the TMN functional layer hierarchy.

The SONET ring 140 is depicted as comprising four Add-Drop Multiplexers (ADMs). However, it will be appreciated by those skilled in the art that SONET rings of any number of ADMs may be employed within the context of the invention. Moreover, it is not necessary for the practice of the invention that a particular type of SONET ring structure be used. Moreover, the operation of the invention may be advantageously adapted to each of a plurality of ring structures. For example, one embodiment of the invention is well suited for use with Uni-Directional Path-Switched Rings (UPSR), while other embodiments of the invention are well suited to Bi-Directional Line-Switched Rings (BLSR) topologies. Additionally, it should be noted that while the SONET ring 140 of FIG. 1 is described as having a particular ring structure, the SONET ring 140 may comprise several different ring or point-to-point network structures.

Specifically, SONET ring 140 comprises a first ADM 142, a second ADM 144, a third ADM 146 and a fourth ADM 148. The first ADM 142 is shown as receiving an input signal IN, illustratively a Digital Signal Level One (DS-1) or Digital Signal Level Three (DS-3). Similarly, the second ADM 144 is depicted as providing an output signal OUT, illustratively a DS-1 or DS-3 signal. For purposes of this discussion, it is assumed that the network manager 110 has determined that the network element comprising the entirety of the SONET ring 140 will be used to pass the DS-1 or DS-3 communication from an input node of the network element to an output node of the network element. The SONET element management system 120 is tasked with routing the communication from the input of the first ADM 142 to the output of the second ADM 144.

In the case of the SONET ring 140 comprising a BLSR ring, the short path between the first ADM 142 and second ADM 144 is a direct path denoted as link E, while the long path traverses ADMs 148 and 146 via links A, B and C. In this embodiment, the load or utilization level of link E is compared to a threshold load or utilization level. Alternate facilities within link E are sought if the load or threshold value exceeds the threshold or utilization level. The test for alternate facilities is repeated until a facility with a threshold or utilization level below a user set value is found. If no alternate facilities are found, the communication is routed via the long path (i.e., links A, B and C), which traverses ADM's 148 and 146, respectively. The user set threshold or utilization level is incrementally changed if any link on the alternate path exceeds the threshold or utilization level.

In the case of the SONET ring 140 comprising a UPSR, there is no short or long path. The UPSR signal travels from a source node to a destination node in both directions and a two-to-one selector selects the best signal at the destination node. For instance, a signal that that travels from first ADM 142 and third ADM 146 takes two paths. The first path comprises links E and F. The second path comprises links A and B. The two-to-one selector at the third ADM 146 selects the best signal i.e. the path comprising links E and F. However, if any one of the links exceeds a user set threshold value or utilization level, alternate facilities will be sought for that particular link.

The search for alternate facilities will be repeated until a facility with a utilization or threshold level below the user set threshold is found. If no facilities are found, the user set threshold or utilization level is incrementally changed for a facility.

Figure 2:
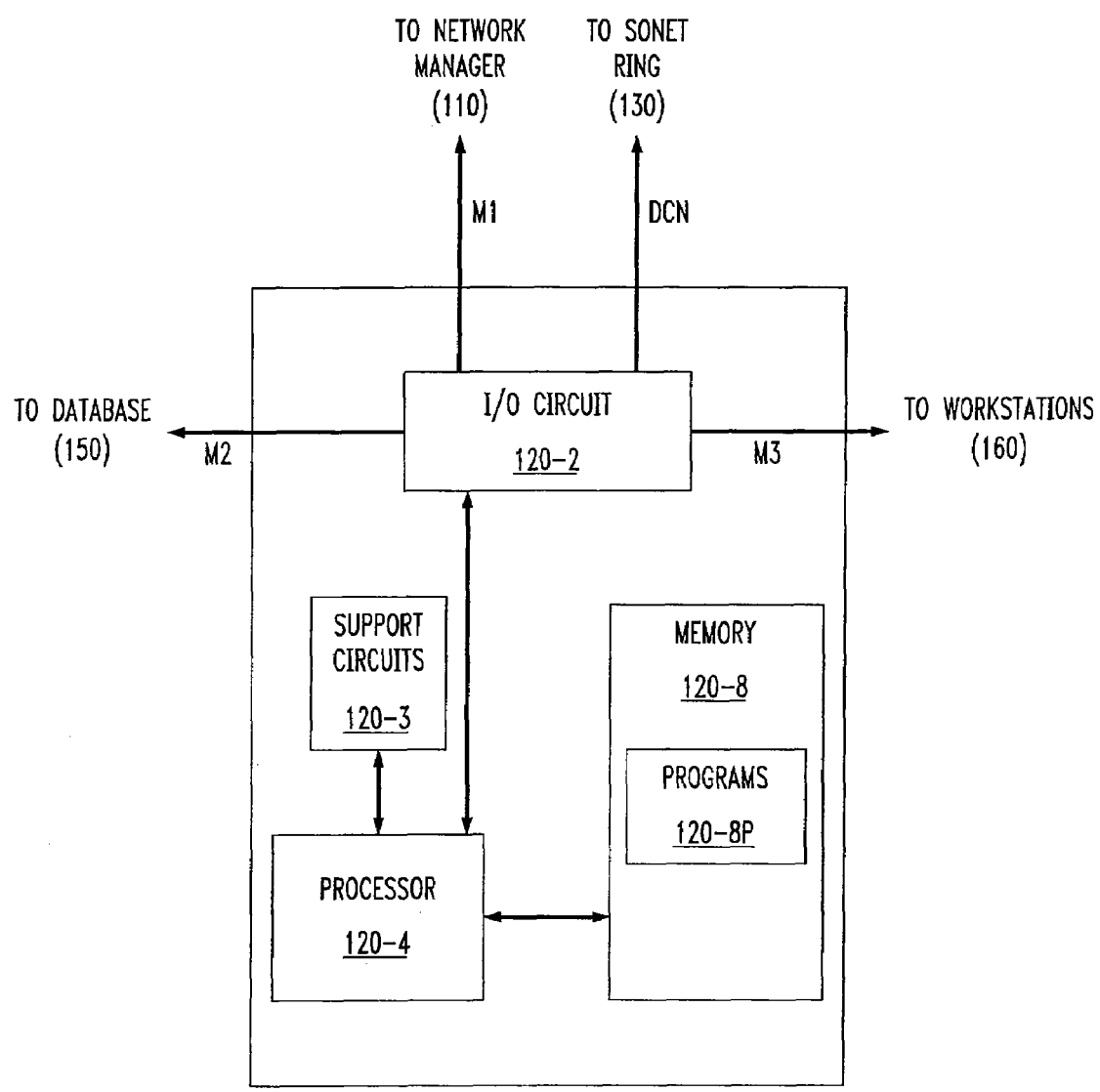
FIG. 2 depicts a high level block diagram of a element manager suitable for use in the communications system of FIG. 1.

FIG. 2 depicts a high level block diagram of an element manager or controller suitable for use in the communications system 100 of FIG. 1. Specifically, the exemplary element manager or controller 120 of FIG. 2 comprises a processor 120-4 as well as memory 120-8 for storing various element management and control programs 120-8P. The processor 120-4 cooperates with conventional support circuitry 120-3 such as power supplies, clock circuits, cache memory and the like as well as circuits that assist in executing the software routines stored in the memory 120-8. As such, it is contemplated that some of the process steps discussed herein as software processes may be implemented within hardware, for example, as circuitry that cooperates with the processor 120-4 to perform various steps. The element manager 120 also contains input-output (I/O) circuitry 120-2 that forms an interface between the various functional elements communicating with the network manager 120. For example, in the embodiment of FIG. 1, the element manager 120 communicates with a database 150 via a signal path M2, each of a plurality of work stations 160 via signal path M3, to a SONET ring 140 via a DCN, and to the network manager via signal path M1.

Although the element manager 120 of FIG. 2 is depicted as a general purpose computer that is programmed to perform various element management functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

The element manager 120 of the present invention communicates with the various work stations 160 such as those being used by network operators servicing customers requesting specific connections.

Figure 3:
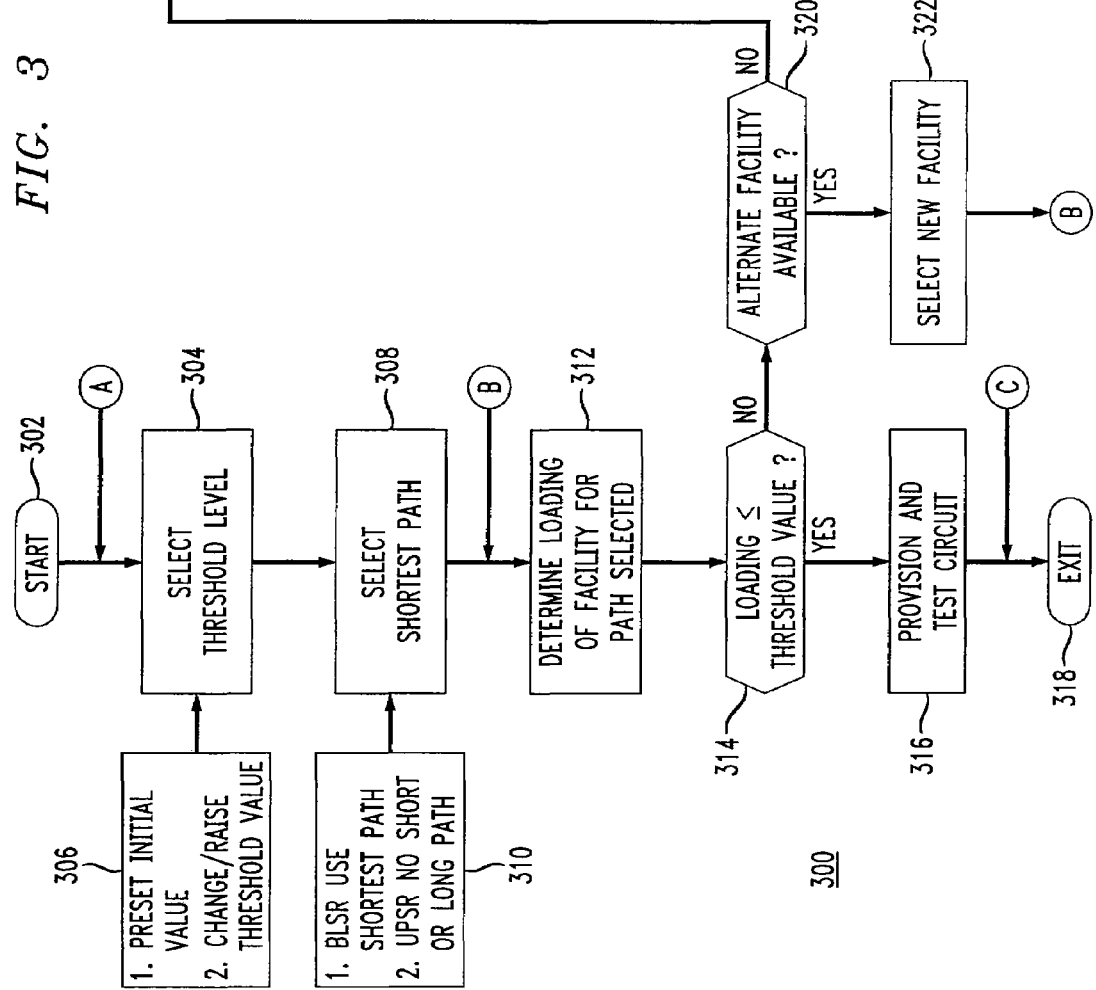
FIG. 3 comprises a flow diagram of a method of selecting a load-balanced short path according to an embodiment of the invention.

FIG. 3 comprises a flow diagram of a method of selecting a load-balanced short path according to an embodiment of the invention. Specifically, the method 300 of FIG. 3 utilizes existing shortest path algorithms in an iterative fashion such that each facility of a proposed short path is checked for loading prior to inclusion within a provisioned SONET ring circuit.

The method 300 of FIG. 3 is entered at step 302 and proceeds to step 304, where a threshold level is selected. Each facility in a link has a user defined threshold. For example, the link connecting first ADM 142 to second ADM 144 can comprise a plurality of facilities. One such facility can be labeled facility "E1", while another can be labeled "E2" and so on. Link E can, illustratively, be an OC3 and the threshold can be set, for example, at one, two or three DS-3s. The threshold will then be 33%, 67% or 100% respectively for the facilities comprising the link.

At step 306 either a preset initial threshold value is selected or the current threshold value is incrementally changed. Changing the current threshold value can occur, for instance, when a previously selected path has a link where a facility has exceeded a threshold value and no alternate facilities are available at that threshold level nor is an alternate path available for that threshold value. The method 300 then proceeds to step 308.

At step 308, the short path is selected from a source node to a destination node in the SONET ring. The short path selected is an "ideal" short path. This ideal short path is based on the topology of the SONET ring and excludes any consideration of the bandwidth utilization levels of facilities within a link.

During the process of selecting the short path from a source node to a destination node reference is made to step 310 where for a BLSR the short path is selected but for a UPSR a path is selected. By definition a UPSR does not have a short path since all signals in the SONET ring travel in both directions in going from a source node to a destination node, and a two-for-one selector selects the best signal. The method 300 then proceeds to step 312.

At step 312 a determination as to the loading of each link in the selected path is made. More specifically, the utilization of bandwidth of a facility in each of the links comprising the selected path is checked against the threshold value.

At step 314 a query is made as to whether the loading of the facility determined at step 312 is less than or equal to the threshold value such as 33%, 57% or 100% or some other value. If the query at step 314 is answered affirmatively, then the method 300 proceeds to step 316. If the query at step 314 is answered negatively, then the method 300 proceeds to step 320.

At step 316 the circuit is provisioned and tested, and then exits at step 318.

At step 320 a query is made as to the availability of an alternate facility within the same link of the short path. This means that if facility "E1" was found to exceed the threshold value a query is made as to whether facility "E2", facility "E3", etc are available. If the query at step 320 is answered affirmatively, then the method 300 proceeds to step 322. If the query at step 320 is answered negatively, then the method 300 proceeds to step 323.

At step 322 a new facility is selected for the link. The method then proceeds to step 312.

At step 323 a query is made as to whether the circuit is a BLSR. If the query at step 323 is answered affirmatively, the method proceeds to step 324. If the query at step 323 is answered negatively, the method proceeds to step 326.

At step 324 a query is made as to whether an opposing path was previously selected. In the case of a BLSR, this means getting to the destination node from the source node via an opposing direction to the short path. This is considered the long path. If the query at step 324 is answered affirmatively, the method 300 proceeds to step 326. If the query at step 324 is answered negatively, the method 300 proceeds to step 330.

At step 330 a path opposing the direction of the short path is selected. That is, for a BLSR the long path is selected. The method 300 then proceeds to step 312.

At step 326 a query is made as to whether to change the threshold value. At this stage there are no available paths or facilities available which meet the loading requirements of the previously defined threshold value. Therefore, in order to provision and test the circuit a new threshold value has to be selected. If the query at step 326 is answered affirmatively, the method 300 proceeds to step 304. If the query at step 326 is answered negatively, the method 300 proceeds to step 328.

At step 328 the circuit is deemed complete but an error message and/or trouble ticket is issued. That is, an error message and/or trouble ticket is issued to alert personnel to the lack of available facilities and/or network elements. Thereafter, a deployment of network elements and/or fiber optic cable may be planned. The method 300 then proceeds to step 318.

An example of threshold level adjustment (per step 304) will now be discussed. Assume that an OC-3 link is configured as three DS-3s or as a Synchronous Transport Signal Level One (STS-1) facility. That is each DS-3/STS-1 is configured for a threshold level, i.e. 50%. Specifically, each DS-3/STS-1 has a threshold of 14 DS-1s. Once the threshold is exceeded for the first DS-3/STS-1, a check is made to determine whether the other facilities within the link are below the threshold value. That is the second DS-3/STS-1 is checked to determine if its bandwidth utilization level is below 14 DS-1s. If the bandwidth of the second DS-3/STS-1 is below the threshold value, the second DS-3/STS-1 facility will be selected for the path. If the second facility is not below the threshold level, the search continues either for an alternate facility or an alternate path.

It should be noted by those skilled in the art that a facility can equate to a link where the threshold level is 100%. For example, if an OC-3 is configured as 84 DS-1s with a threshold level of a 100%, there is no facility balancing. The threshold value will determine whether a link should be equated as a facility.

In each of these examples, it is noted that the "granularity" of the threshold level is determined with respect to the type, for example OC-3, OC-48, OC-192 and such, of link used and the configuration of that link. There are a number of conventional ways to configure a link. Thus, in determining threshold levels to be used in comparing loading levels at step 314, it is important to understand the type of links offered by the network and the configuration of those links into facilities.

Although various embodiments which incorporate the teachings of the present invention have been shown and described in detail herein, those skilled in the art can readily devise many other varied embodiments that still incorporate these teachings.

What is claimed is:

1. A method, comprising the steps of:
 determining a first circuit path between a source node and a destination node in a Synchronous Optical Network (SONET) ring comprising a plurality of nodes interconnected by links, each of said links having associated with it a plurality of facilities, each of said facilities having associated with it a respective bandwidth utilization level, wherein said facilities having bandwidth utilization levels exceeding a first threshold level are not used to define said first circuit path.

2. The method of claim 1, further comprising the step of:
 in a Bi-directional Line Switched Ring (BLSR), selecting a second circuit path in the opposing direction to said first circuit path when facilities in said first circuit path having bandwidth utilization levels below a first threshold level can not be found.

3. The method of claim 2, wherein said first circuit path is a short path.

4. The method of claim 2, wherein said second circuit path is a long path.

5. The method of claim 1, further comprising the step of:
 adjusting said threshold level where the bandwidth utilization levels of facilities in said second path exceed said first threshold level.

6. The method of claim 5, wherein personnel are notified of a lack of facilities.

7. A method, comprising the steps of:
 selecting a path between a source node and a destination node, said path comprising at least two intervening nodes coupled by at least one respective link, where said at least one link has associated with it respective facilities;
 selecting one of said facilities within each of said at least one link for placing service on; and
 determining whether a respective bandwidth utilization level for each selected facility within said circuit path is below a first threshold level.

8. The method of claim 7, further comprising the step of:
 altering the direction of said circuit path, responsive to a negative determination that within at least one link of said path no facilities exist having respective bandwidth utilization levels below said first threshold level for a Bi-directional Line Switched Ring (BLSR).

9. The method of claim 8, further comprising the step of:
 adjusting the first threshold level of said facilities within said at least one link responsive to a negative determination that said respective bandwidth utilization levels of facilities within an altered direction of said circuit path exceed said first threshold level.

10. The method of claim 9, further comprising the step of:
 repeating said step of adjusting until a facility within said at least one link is found having a bandwidth utilization level that is below said adjusted threshold level.

11. The method of claim 10, further comprising:
 alerting personnel concerning lack of facilities.

12. A method, comprising:
 (a) selecting a first path between a source node and a destination node, said first path having at least one link;
 (b) selecting a facility within each of said at least one link connecting the source node to the destination node;
 (c) determining the bandwidth utilization level for each selected facility within each of said at least one link;
 (d) rejecting said selected facility in the case of said respective bandwidth utilization level being above a threshold level; and
 (e) repeating steps (b) through (d) until a circuit path between said starting node and destination node has been determined which meets said threshold level.

13. The method of claim 12, further comprising the step of:
 (f) selecting a path in an opposing direction for a Bi-directional Line Switched Ring (BLSR).

14. The method of claim 13, further comprising the step of
 (g) repeating steps (b) through (e).

15. The method of claim 12, further comprising the step of:
 (h) adjusting the threshold level incrementally.

16. The method of claim 15, further comprising the step of:
 (i) repeating steps (a) through (h).

17. A storage device storing a software program that, when executed by a computer, causes the computer to perform a method comprising the step of:
 determining a first circuit path between a source node and a destination node in a Synchronous Optical Network (SONET) ring comprising a plurality of nodes interconnected by links, where each of said links has associated with it a plurality of facilities and each one of said plurality of facilities has associated with it a respective bandwidth utilization level, said facilities having bandwidth utilization levels exceeding a first threshold level are not used to define said first circuit path.

18. The method of claim 17, further comprising the step of:
 selecting a second circuit path in the opposing direction to said first circuit path where facilities having bandwidth utilization levels below a first threshold level in said first path can not be found for a Bi-directional Line Switched Ring (BLSR).

19. The method of claim 18, further comprising the step of;
 adjusting said threshold level where the bandwidth utilization levels of facilities in said first path exceed said first threshold level.

20. The method of claim 19, further comprising the step of:
 repeating said step of determining.

21. Apparatus, comprising:
 an element manager, for determining a balanced circuit path between a source node and a destination node within a Synchronous Optical Network (SONET) ring comprising a plurality of nodes; and a data base, for storing a respective bandwidth utilization level for each of a plurality of facilities within links interconnecting said nodes;

said element manager determining whether said balanced circuit path is balanced by determining whether one of said plurality of facilities for each of said links interconnecting said nodes has associated with it a bandwidth utilization level exceeding a threshold level, and iteratively selecting another facility within any of said links where the bandwidth utilization level of a previously selected facility has exceeded a threshold level.

22. The apparatus of claim 21, wherein:

in the case of no facilities within said links being below said utilization level, selecting a balanced path in the opposite direction to said first path direction for a Bi-directional Line Switched Ring (BLSR).

23. The apparatus of claim 21, wherein:

in the case no bandwidth utilization level of said facilities within said links being below said threshold level in said opposing direction to said first path, adjusting said threshold level.

* * * * *